(12) United States Patent
Allen et al.

(10) Patent No.: US 7,877,565 B1
(45) Date of Patent: *Jan. 25, 2011

(54) CONSTANT VERSIONING FOR MULTI-THREADED PROCESSING

(75) Inventors: Roger L. Allen, Lake Oswego, OR (US); Cass W. Everitt, Round Rock, TX (US); Henry Packard Moreton, Woodside, CA (US); Thomas H. Kong, Los Altos, CA (US); Simon S. Moy, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1220 days.

This patent is subject to a terminal disclaimer.

(21) Appl. No.: 11/344,445

(22) Filed: Jan. 31, 2006

(51) Int. Cl.
*G06F 12/00* (2006.01)
(52) U.S. Cl. ............... 711/165; 711/E12.068; 711/E12.039; 345/537; 345/557
(58) Field of Classification Search ............... 711/165
See application file for complete search history.

(56) References Cited

U.S. PATENT DOCUMENTS

| | | | |
|---|---|---|---|
| 5,274,811 A | 12/1993 | Borg et al. | |
| 5,821,940 A | 10/1998 | Morgan et al. | |
| 5,958,028 A * | 9/1999 | Bean et al. | 710/62 |
| 6,088,044 A | 7/2000 | Kwok et al. | |
| 6,141,732 A | 10/2000 | Adams | |
| 6,268,874 B1 | 7/2001 | Niu et al. | |
| 6,289,432 B1 | 9/2001 | Ault et al. | |
| 6,339,813 B1 | 1/2002 | Smith et al. | |
| 6,483,505 B1 | 11/2002 | Morein et al. | |
| 6,943,800 B2 | 9/2005 | Taylor et al. | |
| 6,963,345 B2 | 11/2005 | Boyd et al. | |
| 6,980,209 B1 | 12/2005 | Donham et al. | |
| 7,103,720 B1 * | 9/2006 | Moy et al. | 711/122 |
| 7,136,488 B2 | 11/2006 | Hashimoto et al. | |
| 7,653,895 B1 * | 1/2010 | James-Roxby et al. | 717/106 |
| 7,669,015 B2 * | 2/2010 | Dice et al. | 711/152 |
| 2002/0101995 A1 | 8/2002 | Hashimoto et al. | |
| 2003/0020709 A1 | 1/2003 | Naegle et al. | |
| 2003/0112742 A1 | 6/2003 | Piper et al. | |
| 2003/0197707 A1 | 10/2003 | Dawson | |

(Continued)

OTHER PUBLICATIONS

Eggers, et al. "Simultaneous Multithreading: A Platform for Next-Generation Processors," *IEEE Micro*, vol. 17, No. 5, pp. 12-19, Sep./Oct. 1997.

(Continued)

*Primary Examiner*—Hetul Patel
(74) *Attorney, Agent, or Firm*—Patterson & Sheridan, LLP

(57) ABSTRACT

Systems and methods for using multiple versions of programmable constants within a multi-threaded processor allow a programmable constant to be changed before a program using the constants has completed execution. Processing performance may be improved since programs using different values for a programmable constant may execute simultaneously. The programmable constants are stored in a constant buffer and an entry of a constant buffer table is bound to the constant buffer. When a programmable constant is changed it is copied to an entry in a page pool and address translation for the page pool is updated to correspond to the old version (copy) of the programmable constant. An advantage is that the constant buffer stores the newest version of the programmable constant.

20 Claims, 14 Drawing Sheets

U.S. PATENT DOCUMENTS

| | | |
|---|---|---|
| 2004/0207630 A1 | 10/2004 | Moreton et al. |
| 2005/0041037 A1 | 2/2005 | Dawson |
| 2005/0071601 A1 | 3/2005 | Luick |
| 2005/0162437 A1 | 7/2005 | Morein et al. |
| 2005/0243094 A1 | 11/2005 | Patel et al. |
| 2005/0256976 A1 | 11/2005 | Susairaj et al. |
| 2009/0248381 A1 * | 10/2009 | Liu et al. ............ 703/13 |

OTHER PUBLICATIONS

Final Office Action, U.S. Appl. No. 11/344,306, dated Aug. 19, 2009.
Office Action, U.S. Appl. No. 11/344,306, dated Mar. 30, 2010.
Office Action, U.S. Appl. No. 11/344,306 dated Sep. 14, 2010.

* cited by examiner

CONSTANT VERSIONING FOR MULTI-THREADED PROCESSING

BACKGROUND OF THE INVENTION

1. Field of the Invention

Embodiments of the present invention generally relate to multi-threaded processing of graphics data and, more specifically, to using multiple versions of programmable constants within a multi-threaded processor.

2. Description of the Related Art

Conventional systems for performing multi-threaded execution of programs support a single set of programmable constants and a change to one of the constants must be delayed until the constant is no longer used by the program. Typically, any execution unit performing the multi-threaded processing that uses the constant is drained before the constant is changed. Therefore, the processing throughput of the multi-threaded processor may be reduced whenever a programmable constant is changed by a program instruction.

Accordingly, it is desirable to avoid draining an execution unit that is using a programmable constant when the value of the constant is updated.

SUMMARY OF THE INVENTION

The current invention involves new systems and methods for using multiple versions of programmable constants within a multi-threaded processor allow a programmable constant to be changed before a program using the constants has completed execution. Processing performance may be improved since programs using different values for a programmable constant may execute simultaneously. The programmable constants are stored in a constant buffer and an entry of a constant buffer table is bound to the constant buffer. In one embodiment of the invention, when a programmable constant is changed it is copied to an entry in a page pool and address translation for the page pool is updated to correspond to the old version (copy) of the programmable constant. An advantage is that the constant buffer stores the newest version of the programmable constant. In another embodiment of the invention, different versions of a constant buffer may be referenced by a shader program. Each version of the constant buffer may store different constant values and the constant buffer that is used may be changed without interrupting execution of the shader program.

Various embodiments of a method of the invention for storing multiple versions of a programmable constant for use during multi-threaded processing, include storing a first value of the programmable constant in an entry of a constant buffer located at a base address, storing the base address of the constant buffer in a first entry of a constant buffer table, receiving a second value of the programmable constant, incrementing a version value stored in the first entry of the constant buffer table, copying the first value stored in the entry of the constant buffer to a location in a page pool, and storing the second value of the programmable constant in the entry of the constant buffer.

Various embodiments of the invention include a system for storing multiple versions of a programmable constant for use during multi-threaded processing. The system includes a multiprocessor pipeline, a memory, a page pool, and a streaming processor array cache collector that is coupled between the memory and the multiprocessor pipeline. The multiprocessor pipeline is configured to execute shader program data processing commands using a set of programmable constants, wherein the set of programmable constants includes a current version of the programmable constant and an old version of the programmable constant. The memory is configured to store a constant buffer that includes the current programmable constant. The page pool is configured to store the old version of the programmable constant. The streaming processor array cache collector is configured to generate the old version of the programmable constant by copying the current version of the programmable constant from the constant buffer to the page pool and changing the value stored as the current version of the programmable constant in the constant buffer.

Various embodiments of the invention include a programmable graphics processor configured to perform multi-threaded processing of graphics data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Systems and methods for using multiple versions of programmable constants within a multi-threaded processor allow a programmable constant to be changed before a program using the constants has completed execution. Processing performance may be improved since programs using different values for a programmable constant may execute simultaneously. Conventional systems do not allow changing a constant until the constant is no longer used. Therefore, any constant changes are delayed and the processing throughput is reduced. Conventional system performance may be significantly reduced when the processing pipeline is many cycles deep or if the constants are changed frequently.

Figure 1A:
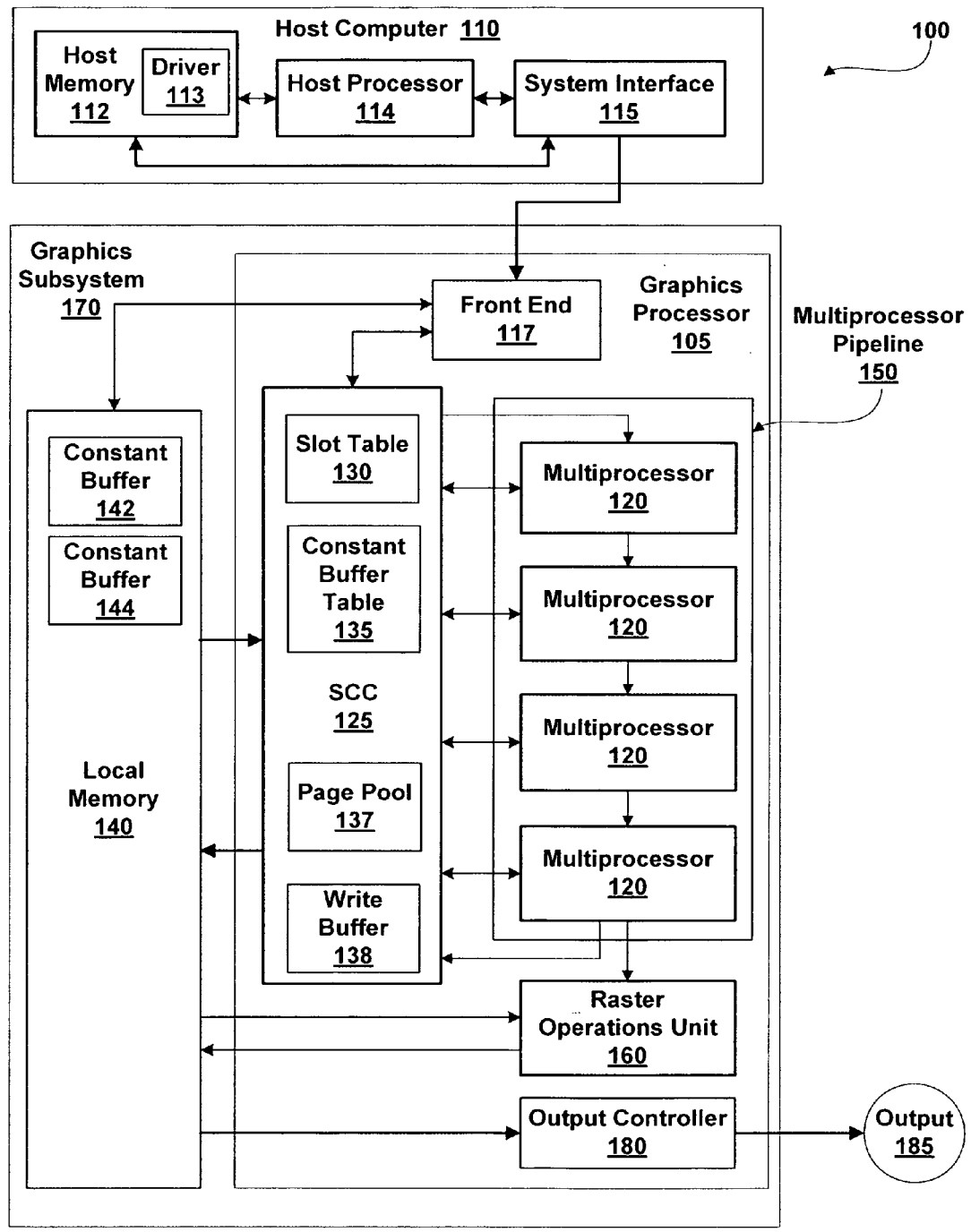
FIG. 1A illustrates computing system in accordance with one or more aspects of the present invention.

FIG. 1A is an illustration of a computing system generally designated 100 and including a host computer 110 and a graphics subsystem 170. Computing system 100 may be a desktop computer, server, laptop computer, palm-sized computer, tablet computer, game console, portable wireless terminal such as a personal digital assistant (PDA) or cellular telephone, computer based simulator, or the like. Host computer 110 includes host processor 114 that may include a system memory controller to interface directly to host memory 112 or may communicate with host memory 112 through a system interface 115. System interface 115 may be an I/O (input/output) interface or a bridge device including the system memory controller to interface directly to host memory 112. An example of system interface 115 known in the art includes Intel® Northbridge.

A graphics device driver, driver 113, interfaces between processes executed by host processor 114, such as application programs, and a programmable graphics processor 105, translating program instructions as needed for execution by graphics processor 105. Driver 113 also uses commands to configure sub-units within graphics processor 105. Specifically, driver 113 may determine which method is used to update constants to create versions of the constants. For example, when many constants are changed by a program driver 113 may store an additional constant buffer for each version of the constants. When only a few constants are changed by the program, driver 113 may change individual constant values one-at-a-time. This process is said to be creating new versions of the entire constant buffer containing those constants.

Host computer 110 communicates with graphics subsystem 170 via system interface 115 and a front end 117 within graphics processor 105. Data and/or commands received at front end 117 may be written to a local memory 140 by front end 117. Graphics processor 105 uses graphics memory to store graphics data and program instructions, where graphics data is any data that is input to or output from components within the graphics processor. Graphics memory may include portions of host memory 112, local memory 140, register files coupled to the components within graphics processor 105, and the like.

Front end 117 receives commands, interprets and formats the commands, and outputs the formatted commands to multiprocessor pipeline 150 via SCC (scalar processor array cache collector) 125. Some of the formatted commands are used by multiprocessors 120 within multiprocessor pipeline 150 to initiate processing of data by providing the location of program instructions or graphics data stored in memory. Front end 117 and SCC 125 each include an interface through which program instructions and data can be read from memory, e.g., any combination of local memory 140 and host memory 112.

Multiprocessor 120 and raster operation unit 160 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Multiprocessors 120 are each optionally configured such that data processing operations are performed in multiple passes through those units or in multiple passes through multiprocessor pipeline 150 via SCC 125. Commands may be fedback from the output of multiprocessor pipeline 150 to SCC 125. Shaded pixels are output from multiprocessor pipeline 150 to raster operation unit 160. Additionally, each multiprocessor 120 within multiprocessor pipeline 150 has a separate communication path to SCC 125 that bypasses the path from SCC 125 through each multiprocessor 120 within multiprocessor pipeline 150. Raster operation unit 160 includes a read interface and a write interface through which data can be read from and written to memory. SCC 125 optionally reads processed data, e.g., data written by raster operation unit 160, from memory and outputs the data, processed data and formatted commands to multiprocessor pipeline 150.

In a typical implementation multiprocessor pipeline 150 performs geometry computations, rasterization, and fragment computations. Therefore, multiprocessor pipeline 150 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like. Each multiprocessor 120 within multiprocessor pipeline 150 may execute one or more programs using multi-threaded execution techniques to process the samples. Therefore, each multiprocessor 120 may be simultaneously executing one or more of the same programs to process a portion of the samples.

Samples output by multiprocessor pipeline 150 are passed to raster operations unit 160, which optionally performs near and far plane clipping and raster operations, such as stencil, z test, and the like, and saves the results or the samples output by multiprocessor pipeline 150 in local memory 140. When the data received by graphics subsystem 170 has been completely processed by graphics processor 105, an output 185 of graphics subsystem 170 is provided using an output controller 180. Output controller 180 reads pixel data from local memory 140 and is optionally configured to deliver data to a display device, network, electronic control system, other computing system such as computing system 100, other graphics subsystem 170, or the like. Alternatively, data is output to a film recording device or written to a peripheral device, e.g., disk drive, tape, compact disk, or the like.

Each set of samples received by a multiprocessor 120 is processed according to at least one program. A program can process one or more sets of samples. Conversely, a set of samples can be processed by a sequence of one or more programs, e.g., vertex program, geometry program, pixel program, or the like. Some embodiments of multiprocessor 120 include units configured to perform specific functions such as rasterization of primitive data to generate fragment data. Other embodiments of multiprocessor pipeline 150 include additional units configured to perform specific functions such as rasterization, viewport transform, clipping, culling, or the like.

Samples, e.g., surfaces, primitives, processed data, or the like, are received by multiprocessor pipeline 150 from front end 117. Surfaces may be processed by one or more multiprocessor 120 to produce primitives, the primitives may be processed by one or more multiprocessor 120 to produce vertices, and the vertices may be processed by one or more multiprocessor 120 to produce fragments. In alternative embodiments of the present invention one or more one or more multiprocessor 120 is included within a general purpose processor, such as host processor 114. In some embodiments of multiprocessor 120, a read interface (not shown in FIG. 1A) is used to read graphics data such as texture maps from local memory 140 or host memory 112 via SCC 125.

In some embodiments of the present invention, a first program executed in multiprocessor pipeline 150 is a vertex shader that performs transform and lighting operations on a set of vertices. A second program, a geometry shader, may then be executed in multiprocessor pipeline 150 to process a region of the processed vertices and produce a number of primitives. The primitives may be stored in graphics memory or rasterized, using techniques known to those skilled in the art, to produce triangle attributes and per-pixel coverage information. A third program, a pixel shader, may be executed in multiprocessor pipeline 150 to process the triangle attributes and produce fragment data, e.g., color, alpha, depth. Raster operations unit 160 may blend the fragment data with existing pixel data stored in graphics memory and write the blended fragment data to graphics memory.

Programmable constants used by the programs are stored in a constant buffer, such as constant buffer 142 and constant buffer 144, by SCC 125. A write buffer, write buffer 138, may be used to buffer constants that have been changed and write them to constant buffer 142 or 144 when write buffer 138 is full, a memory page boundary is crossed, or the like. Write buffer 138 may improve memory access performance and reduce the memory bandwidth that is consumed by combining several writes to constant buffer 142 and 144 into a single write transaction. The constants are read as operands to instructions by programs as the programs are executed by one or more multiprocessor 120. Each multiprocessor 120 within multiprocessor pipeline 150 has a direct path to SCC 125 for reading constant values used as operands. The instructions, e.g., data processing commands, are output by SCC 125 to multiprocessor pipeline 150 and are passed to each multiprocessor 120 so that each multiprocessor 120 that is configured to execute the shader program will receive the commands.

A constant buffer may be sized to store a complete set of constants, including as many constants as are permitted by an applications programming interface. Although constant buffers 142 and 144 are shown to be stored in local memory 140, constant buffers may be stored in any graphics memory. An entry of a constant buffer table, constant buffer table 135, is written with a pointer, i.e., base address plus offset, to a constant buffer. A slot table, slot table 130, includes several entries, each of which may be bound to an entry of constant buffer table 135. A separate slot table may be used for each type of shader program, e.g., geometry, vertex, and pixel.

In one embodiment of the present invention, when a programmable constant is changed it is copied to an entry in a page pool, page pool 137, and an address translation table for page pool 137 is updated to correspond to the old version (copy) of the programmable constant. An advantage is that a constant buffer stores the newest version of the programmable constant and all older versions are stored in page pool 137. In another embodiment of the present invention, a new constant buffer is written with the changed constants and the constant buffer table is changed to point to the newest version of the programmable constants.

Figure 1B:
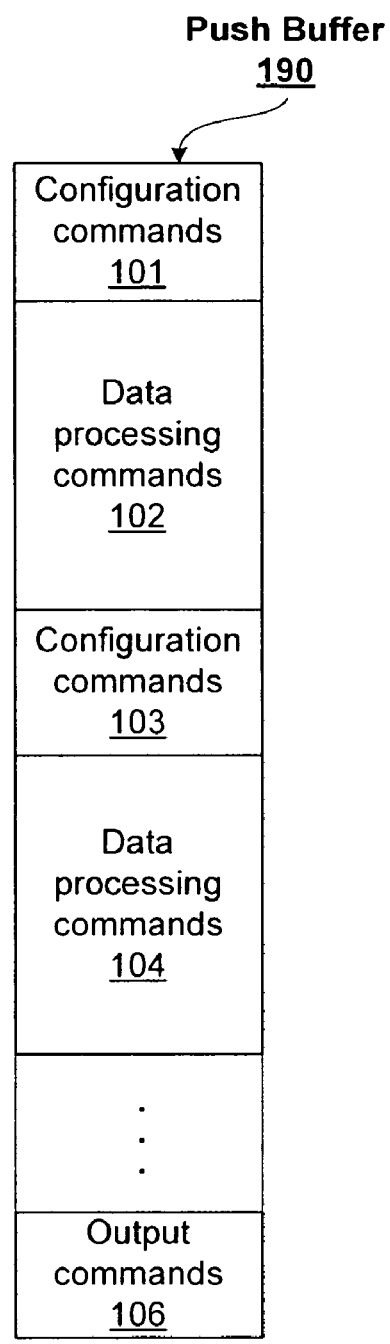
FIG. 1B illustrates a conceptual diagram of a sequence of commands that configure the graphics processor of FIG. 1A in accordance with one or more aspects of the present invention.

FIG. 1B illustrates a conceptual diagram of a sequence of commands that configure graphics processor 105, push buffer 190, in accordance with one or more aspects of the present invention. Push buffer 190 includes configuration commands 101 and 103, data processing commands 102 and 104, and output image instructions 106. Configuration commands 101 and 103 specify the configuration for programmable units within graphics processor 105, such as multiprocessors 120, raster operations unit 160, SCC 125, and front end 117. Configuration commands 101 and 103 may be used to set up a particular processing state for use when processing a set of samples. Configuration commands 101 and 103 may include one or more load constant commands, load constant buffer table commands, and bind constant buffer commands. Although the programmable constants may be loaded with particular values, the constants are "read only" during execution of a shader program, i.e., during execution of data processing commands 102 and 104. The programmable constants may be used to change model matrices, base color values, or the like. Configuration commands 101 may specify a first version of constants and configuration commands 103 may specify a second version of constants. Configuration commands 101 and 103 are followed by data processing commands 102 and 104, respectively. Data processing commands 102 and 104 include instructions that specify sample processing operations, such as multiply, add, texture lookup, or the like. Output commands 106 may be included at the end of a shader program to output image data via output controller 180.

Conventional multi-threaded processors may require that a flush (wait for idle) command be included between data processing commands 102 and configuration commands 103 to ensure that constants specified as operands in data processing commands 102 are no longer in use when configuration commands 103 are executed, since configuration commands 103 may change the constants. Flushing the multi-threaded processor may reduce the data processing throughput of the processor and is therefore undesirable. When the systems and method of the present invention are used, flushes are not needed between data processing commands 102 and configuration commands 103 since multiple versions of constants may be accessed by one or more shader programs executing within multiprocessor pipeline 150.

Figure 1C:
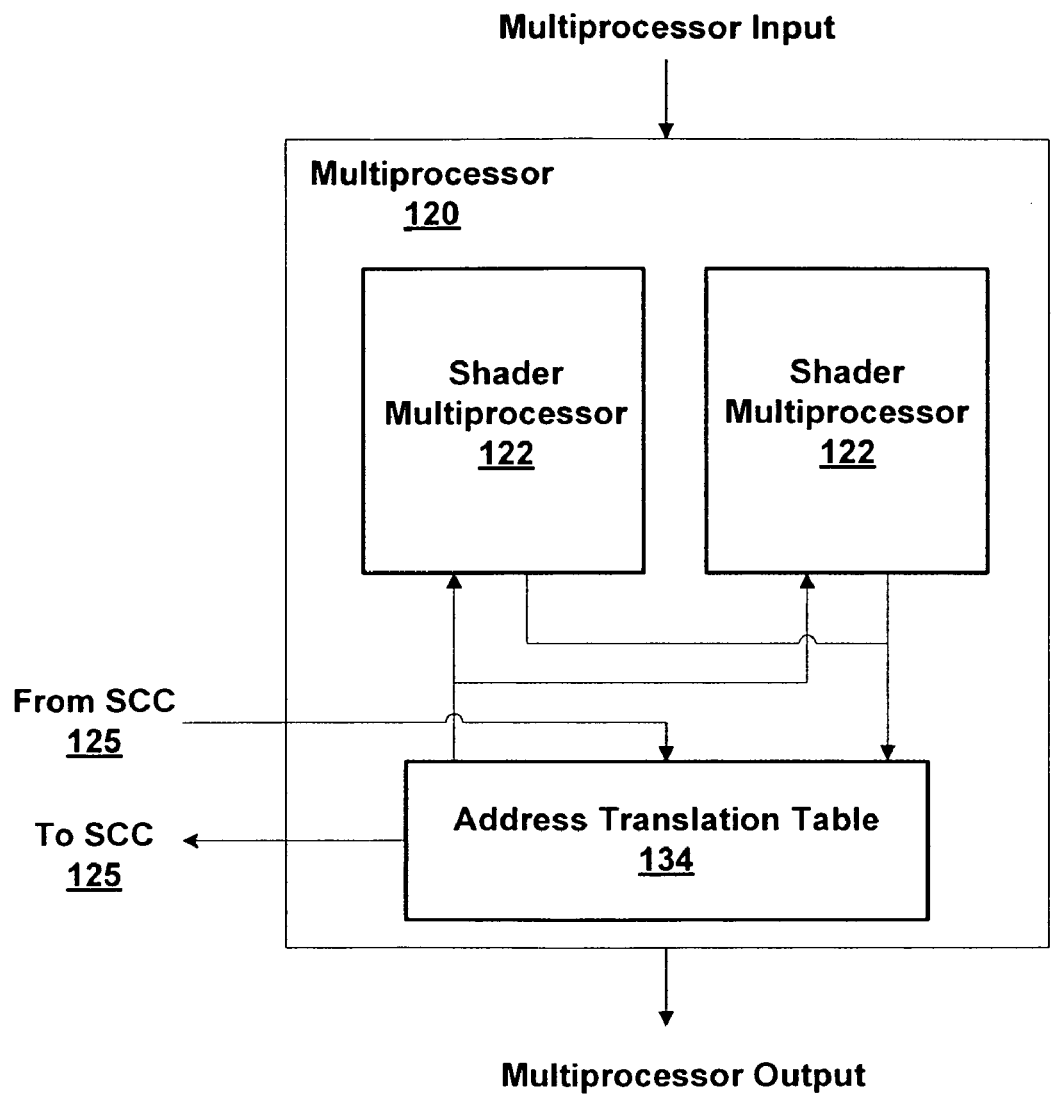
FIG. 1C illustrates a multiprocessor of FIG. 1A in accordance with one or more aspects of the present invention.

FIG. 1C illustrates a multiprocessor 120 of FIG. 1A in accordance with one or more aspects of the present invention. Multiprocessor 120 includes one or more shader multiprocessors 122. Each shader multiprocessor 122 may be configured to execute one or more shader programs using multi-threaded techniques. Shader multiprocessors 122 may read programmable constants via direct communication paths with SCC 125 using addresses produced using an address translation table 134. Address translation table 134 receives the constant buffer table index and the shader type and provides the virtual address corresponding to the version of the constant stored in page pool 137 or to the page including the version of the constant stored in page pool 137. The offset indicating the position of the constant within the constant buffer may be combined with the virtual address to create an address for a constant within a page. In some embodiments of the present invention, constant buffer table indexes and version values that are not stored in the address translation table 134 correspond to constants that are stored in constant buffer 142 or 144. In other embodiments of the present invention, address translation table 134 also stores virtual addresses for constants stored in constant buffers 142 and 144.

When a constant or portion of a constant buffer is copied to page table 137, SCC 125 updates address translation table 134 by writing an entry in address translation table 134 with the virtual address of the location in page pool 137 that the constant or portion of the constant buffer is copied to. The entry is indexed by the constant buffer table index and version value provided by SCC 125.

Figure 2A:
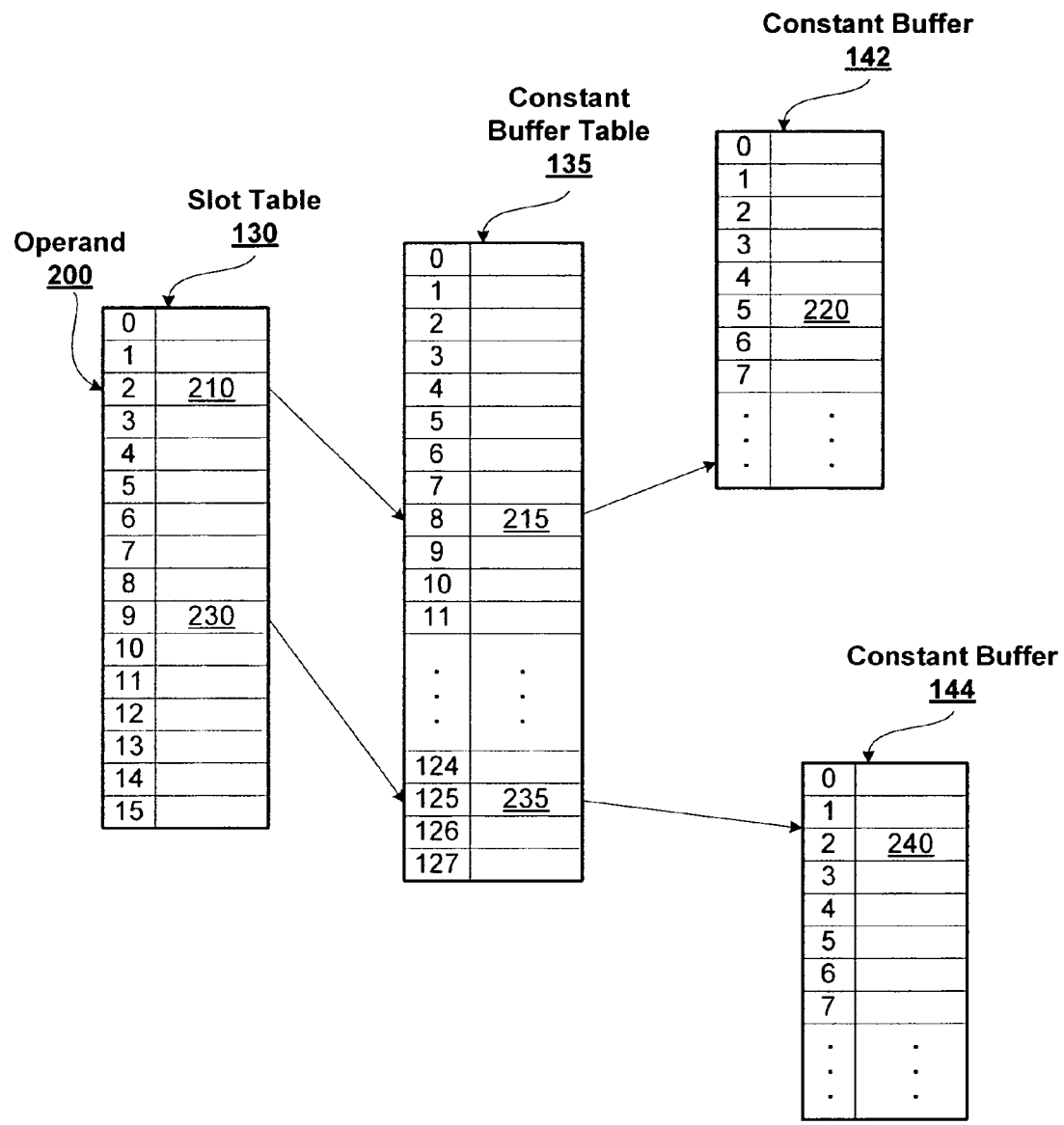
FIG. 2A illustrates a conceptual diagram of the slot table, constant buffer table and constant buffers shown in FIG. 1A in accordance with one or more aspects of the present invention.

FIG. 2A illustrates a conceptual diagram of slot table 130, constant buffer table 135 and constant buffers 142 and 144 of FIG. 1A in accordance with one or more aspects of the present invention. In some embodiments of the present invention, a constant buffer may include as many as 65,536 constant values and each shader type may access as many as 16 constant buffers. The number of constant buffers a shader program may access is limited by the number of entries in slot table 130. In some embodiments of the present invention, an address translation table 134 is included in each multiprocessor 120 and the address translation tables 134 are updated in parallel using the separate communication paths between SCC 125 and each multiprocessor 120, so that any shader program being executed by a multiprocessor 120 will read the correct constant used as an operand.

Constant buffer 142 stores a first programmable constant value in a sixth entry, entry 220. Constant buffer 144 stores a second programmable constant value in a third entry, entry 240. Constant buffer table 135 includes 128 entries that may each include a pointer to a constant buffer, e.g. constant buffer 142 and constant buffer 144. In other embodiments of the present invention, constant buffer table 135 includes fewer or more entries. A ninth entry of constant buffer table 135, entry 215 stores a pointer to constant buffer 142, e.g., base address, corresponding to the location of constant buffer 142 in graphics memory. A one-hundred and twenty-sixth entry of constant buffer table 135, entry 235, stores a base address corresponding to constant buffer 144. The base address may be a virtual address corresponding to location in graphics memory or the base address may be an offset specifying a location in graphics memory. An entry in constant buffer table 135 may be written using a load constant buffer table command that specifies the base, a size of the constant buffer, and the index corresponding to an entry of the constant buffer table 135 to be written. Indexes of constant buffer table 135 are shown in the first column of constant buffer table 135.

Programmable constant values may be stored in constant buffer 142 or 144 by first selecting a constant buffer, i.e., specifying an index corresponding to an entry in constant buffer table 135, and providing an offset specifying an entry within the selected constant buffer to start loading with constant values. A load constant selector command may be used to select the constant buffer and specify an offset. A load constant command may be used to specify a set of constant values to load into sequential entries in the selected constant buffer, starting with the entry specified by the offset. For example, entry 220 of constant buffer 142 is specified by offset 5 and entry 240 of constant buffer 144 is specified by offset 2. Constant buffer offsets are shown in the first column of constant buffer 142 and constant buffer 144.

Slot table 130 includes 16 entries that may each include a pointer to an entry in constant buffer table 135. In other embodiments of the present invention, slot table 130 includes fewer or more entries. A third entry of slot table 130, entry 210 stores an index (8) corresponding to constant buffer table 135 entry 215. A tenth entry of slot table 130, entry 230, stores an index (125) corresponding to constant buffer table 135 entry 235. An entry in slot table 130, i.e., a slot, may be written using a bind constant buffer command that binds an entry in slot table 130 to an entry in constant buffer table 135, thereby binding a slot to a particular constant buffer. The bind constant buffer command specifies the index corresponding to an entry in constant buffer table 135 and the slot (entry of slot table 130) to be written. The bind constant buffer command may also include a valid flag to indicate whether the slot should be bound to an entry in constant buffer table 135 or unbound from any entry in constant buffer table 135. In some embodiments of the present invention, a different slot table 130 is used for each type of shader program and the bind constant buffer command specifies the shader program type to indicate a specific slot table to be written. Slots in different slot tables may be configured to store the same index, i.e., an index corresponding to a single entry in constant buffer table 135.

An operand, such as operand 200 that is received with a shader program instruction includes a slot and a constant buffer offset to specify a particular programmed constant value. For example, an operand 200 of c[2][5] specifies the constant value stored in entry 5 of the constant buffer that is bound to the second slot, i.e. entry 220 of constant buffer 142. From a shader program's perspective, there are 16 constant buffers and each constant buffer may have a different size. Note that operand 200 does not include a version value since generation and management of versions of constants is managed by SCC 125 and is therefore "transparent" to the shader program.

Figure 2B:
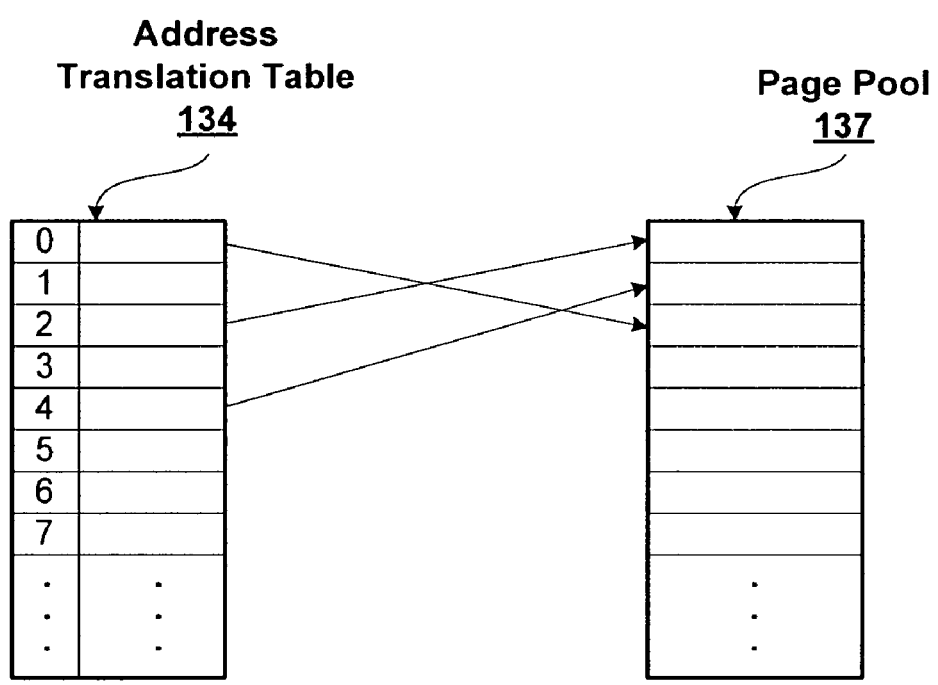
FIG. 2B illustrates a conceptual diagram of the page pool shown in FIG. 1A and an address translation table in accordance with one or more aspects of the present invention.

FIG. 2B illustrates a conceptual diagram of page pool 137 shown in FIG. 1A and an address translation table, address translation table 134 shown in FIG. 1C, in accordance with one or more aspects of the present invention. Address translation table 134 receives the constant buffer table index and version value and provides the virtual address corresponding to the version of the constant stored in page pool 137. The offset may be combined with the virtual address to locate a particular constant within the constant buffer.

In some embodiments of the present invention, page pool 137 is written in page size units. Therefore, a location in page pool 137 may store an entire page of memory, not just a single version of a constant and the virtual address provided by address translation table 134 corresponds to a location (page) in page pool 137. When a version of a constant is generated address translation table 134 is updated to store the location of the old version in page table 137. When old versions of the constants are no longer needed, address translation table 134 is updated to effectively remove the old version from page table 137, freeing the location that stored the old version in page table 137.

Figure 3A:
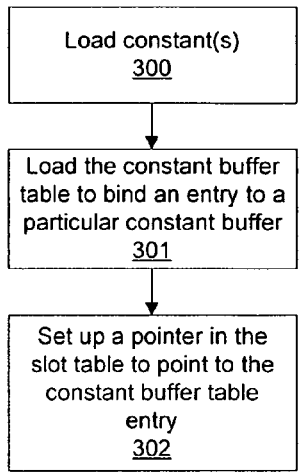
FIG. 3A illustrates a flow diagram of an exemplary method of loading constants and binding to constant buffers in accordance with one or more aspects of the present invention.

FIG. 3A illustrates a flow diagram of an exemplary method of loading constants and binding to constant buffers in accordance with one or more aspects of the present invention. In step 300 one or more constants are loaded into one or more constant buffers, such as constant buffers 142 and 144. In step 301 one or more entries of constant buffer table 135 are written with a base and a size of one or more constant buffers. Each constant buffer table 135 entry also includes a reference count, version value, and "being updated" flag. The reference count indicates the number of valid slots that point to the entry, i.e., slots that store the index corresponding to the entry. The version value corresponds to the current version of a constant buffer. The current version is the version that will be used by any data processing commands subsequently output by SCC 125 to multiprocessor pipeline 150. Previous versions of the constants will be used by any data processing commands output before the configuration command that resulted in the new version of the constants. In other embodiments of the present invention, the version value may indicate the number of versions currently active or potentially being accessed. The "being updated" flag indicates when a change to a constant is inflight within SCC 125 and prevents the generation of a new version until the push buffer execution transitions from configuration commands to data processing commands.

In step 302 a pointer is written in an entry in slot table 130 to bind a slot to a particular constant buffer. Specifically, an index corresponding to an entry of constant buffer table 135 is stored in a slot to bind the slot to the particular constant buffer. The entry in slot table 130 may also include a "bound" flag indicating whether or not the slot is bound to a constant buffer.

Figure 3B:
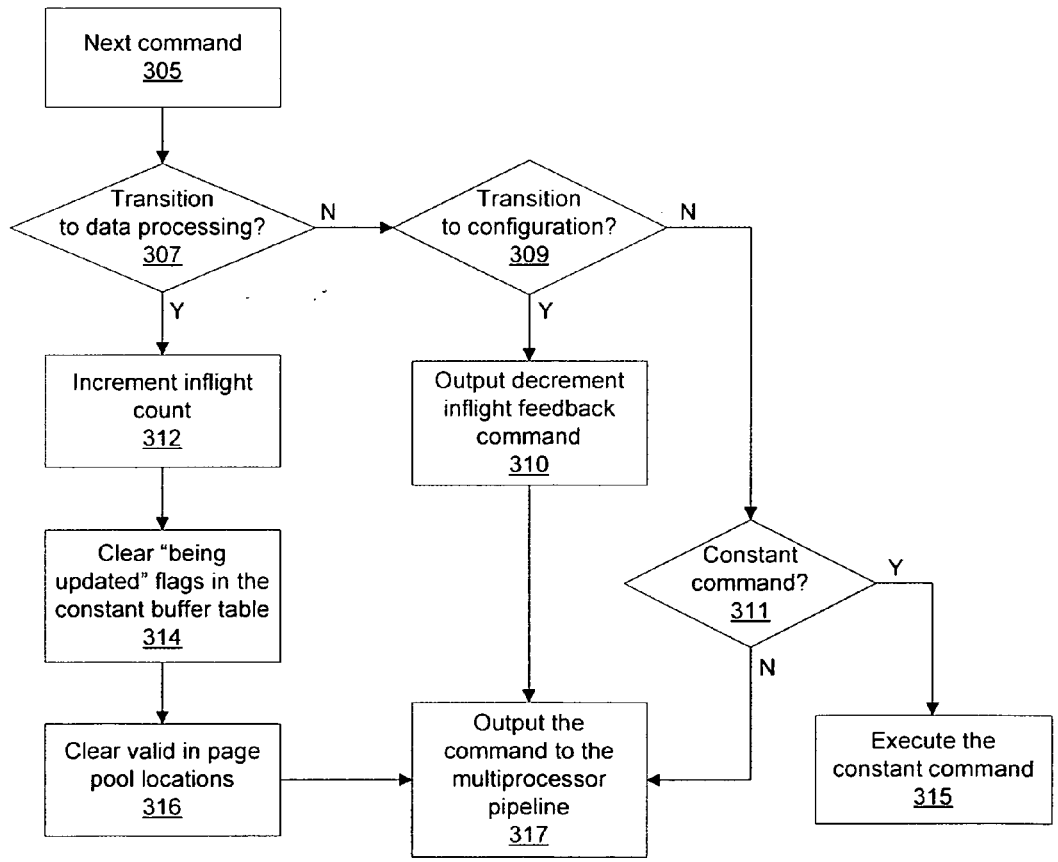
FIG. 3B illustrates a flow diagram of command processing in accordance with one or more aspects of the present invention.

FIG. 3B illustrates a flow diagram of command processing in accordance with one or more aspects of the present invention. SCC 125 receives commands, such as push buffer 190 shown in FIG. 1B, from front end 117. SCC 125 is also configured to generate feedback commands that are input to multiprocessor pipeline 150 and are returned from multiprocessor pipeline 150 to SCC 125 when all multiprocessors 120 have received them. The feedback commands are used to track and update state related to the programmable constants, as described in conjunction with FIG. 3C.

In step 305 a command, e.g., data processing or configuration, is received by SCC 125. In step 307 SCC 125 determines if the command is a transition from configuration commands to data processing commands, and, if so, then in step 312 SCC 125 increments an inflight count. When each constant is not programmed more than once during a sequence of configuration commands, the inflight count indicates the maximum number of versions of any constant that may be in use in multiprocessor pipeline 150. In step 314 the "being updated" flags in constant buffer table 135 are cleared in order to permit generation of a new version of the constants when the next sequence of configuration commands is received. In step 316 valid flags in page pool 137 are cleared to indicate that the page(s) have been updated. When write buffer 138 is included in SCC 125, any data stored in write buffer 138 is stored to the corresponding constant buffer in graphics memory in preparation for constant buffer reads during data processing. In step 317 SCC 125 outputs the data processing command to multiprocessor pipeline 150 for execution.

If, in step 307 SCC 125 determines that the command is not a transition from configuration commands to data processing commands, then in step 309 SCC 125 determines if the command is a transition from data processing commands to configuration commands. If, in step 309 SCC 125 determines that the command is not a transition from data processing commands to configuration commands, then in step 311 SCC 125 determines if the command is a constant configuration command, and, if so, in step 315 SCC 125 executes the constant configuration command as described in conjunction with FIGS. 3D, 3E, 4A, 4B, and 6. Constant configuration commands may include a load constant buffer table command, a bind constant buffer command, a load constant command, or the like. If, in step 311 SCC 125 determines that the command is not a constant configuration command, then in step 317 SCC 125 outputs the command to multiprocessor pipeline 150 for execution.

If, in step 309 SCC 125 determines that the command is a transition from data processing commands to configuration commands, then in step 310 SCC 125 generates a decrement inflight feedback command and outputs the decrement inflight feedback command to multiprocessor pipeline 150. When the decrement inflight feedback command is received by SCC 125 from multiprocessor pipeline 150, SCC 125 decrements the inflight count, as described in conjunction with FIG. 3C. In step 315 SCC 125 outputs the configuration command to multiprocessor pipeline 150 for execution. In some embodiments of the present invention, some commands are executed by SCC 125 and are not output to multiprocessor pipeline 150 for execution.

Figure 3C:
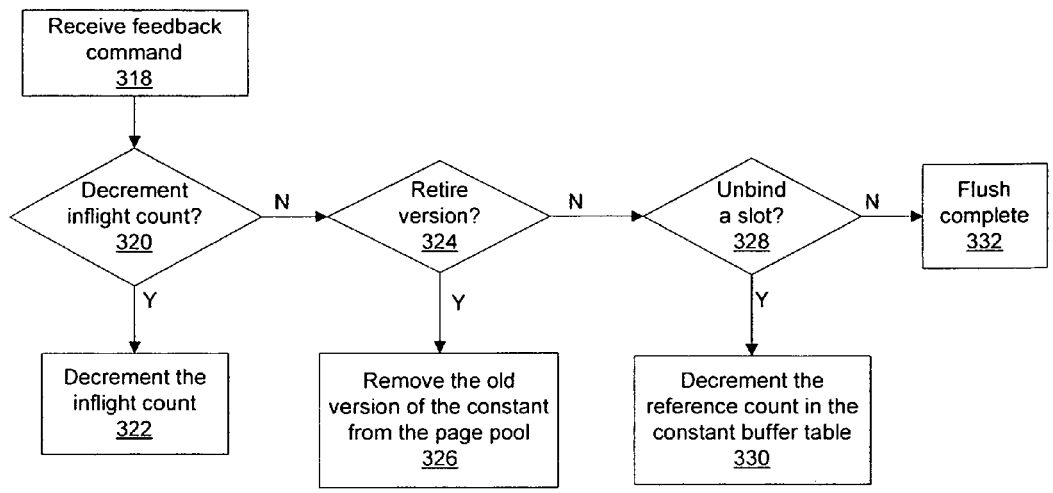
FIG. 3C illustrates a flow diagram of feedback command processing in accordance with one or more aspects of the present invention.

FIG. 3C illustrates a flow diagram of feedback command processing performed by SCC 125 in accordance with one or more aspects of the present invention. In step 318 SCC 125 receives a feedback command from multiprocessor pipeline 150. In step 320 SCC 125 determines if the feedback command is a decrement inflight count feedback command, and, if so, in step 322 SCC 125 decrements the inflight count. If, in step 320 SCC 125 determines that the feedback command is not a decrement inflight count feedback command, then in step 324 SCC 125 determines if the feedback command is a retire version feedback command. The conditions under which a retire version feedback command are output are described in conjunction with FIG. 4A.

If, in step 324 SCC 125 determines that the feedback command is a retire version feedback command, then in step 326 SCC 125 removes the old version of the constant from page pool 137. If, in step 324 SCC 125 determines that the feedback command is not a retire version feedback command, then in step 328 SCC 125 determines if the feedback command is an unbind slot feedback command. If, in step 328 SCC 125 determines that the feedback command is an unbind slot feedback command, then in step 330 SCC 125 decrements the reference count stored in the constant buffer corresponding to the index of the slot specified by the unbind slot feedback command. If, in step 328 SCC 125 determines that the feedback command is not an unbind slot feedback command, then the feedback command is a flush feedback command, and in step 332 SCC 125 proceeds with loading constant buffer table 135, as described in conjunction with FIG. 3D.

Figure 3D:
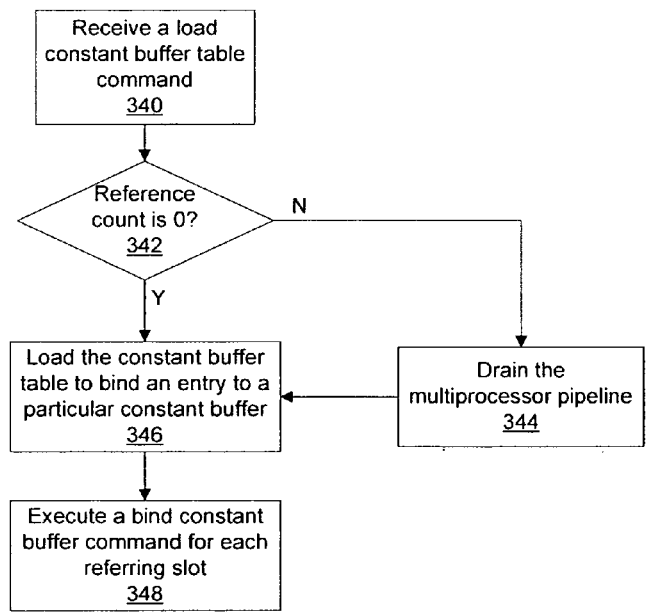
FIG. 3D illustrates a flow diagram of loading a constant buffer table in accordance with one or more aspects of the present invention.

FIG. 3D illustrates a flow diagram of loading constant buffer table 135 in accordance with one or more aspects of the present invention. Once one or more constant buffers, such as constant buffers 142 and 144 have been loaded with constant values, constant buffer table 135 may be written to use the constant values during execution of a shader program. Writing an entry in constant buffer table 135 to point to a different constant buffer is an efficient way to change the constant value used by a shader program, particularly when several or all of the constants are changed.

In step 340 SCC 125 receives a load constant buffer table command to write an entry in constant buffer table 135. In some embodiments of the present invention, a load constant buffer table command includes a base, size, and index. The index indicates the entry to be written with base and size of a particular constant buffer. In step 342 SCC 125 determines if the reference count stored in the entry is equal to 0, and, if so, no slots of slot table 130 are bound to the entry and SCC 125 proceeds to step 346. If, in step 342 SCC 125 determines that the reference count stored in the entry is not equal to 0, then in step 344 SCC 125 outputs a flush feedback command to multiprocessor pipeline 150 and waits for the flush feedback command to return after multiprocessor pipeline 150 is flushed. Flushing multiprocessor pipeline 150 ensures that any shader programs have completed execution and that any constants may be changed without adversely affecting the results of the shader programs. Therefore, when using a load constant buffer table command to change constants, it is best to bind a constant buffer including the changed constants to an entry in constant table buffer 135 that is not bound to a slot of slot table 130.

In step 346 SCC 125 writes the entry corresponding to the index with the base and size to bind the entry to the particular constant buffer corresponding to the base. In some embodiments of the present invention, in step 346 the version count stored in the entry is incremented. In step 348 SCC 125 generates and executes a bind constant buffer command for each slot of slot table 130 that is bound to the entry, i.e. for each referring slot. It is necessary to execute the bind constant buffer command in order to update the address translation for each slot that is now bound to a different constant buffer.

Figure 3E:
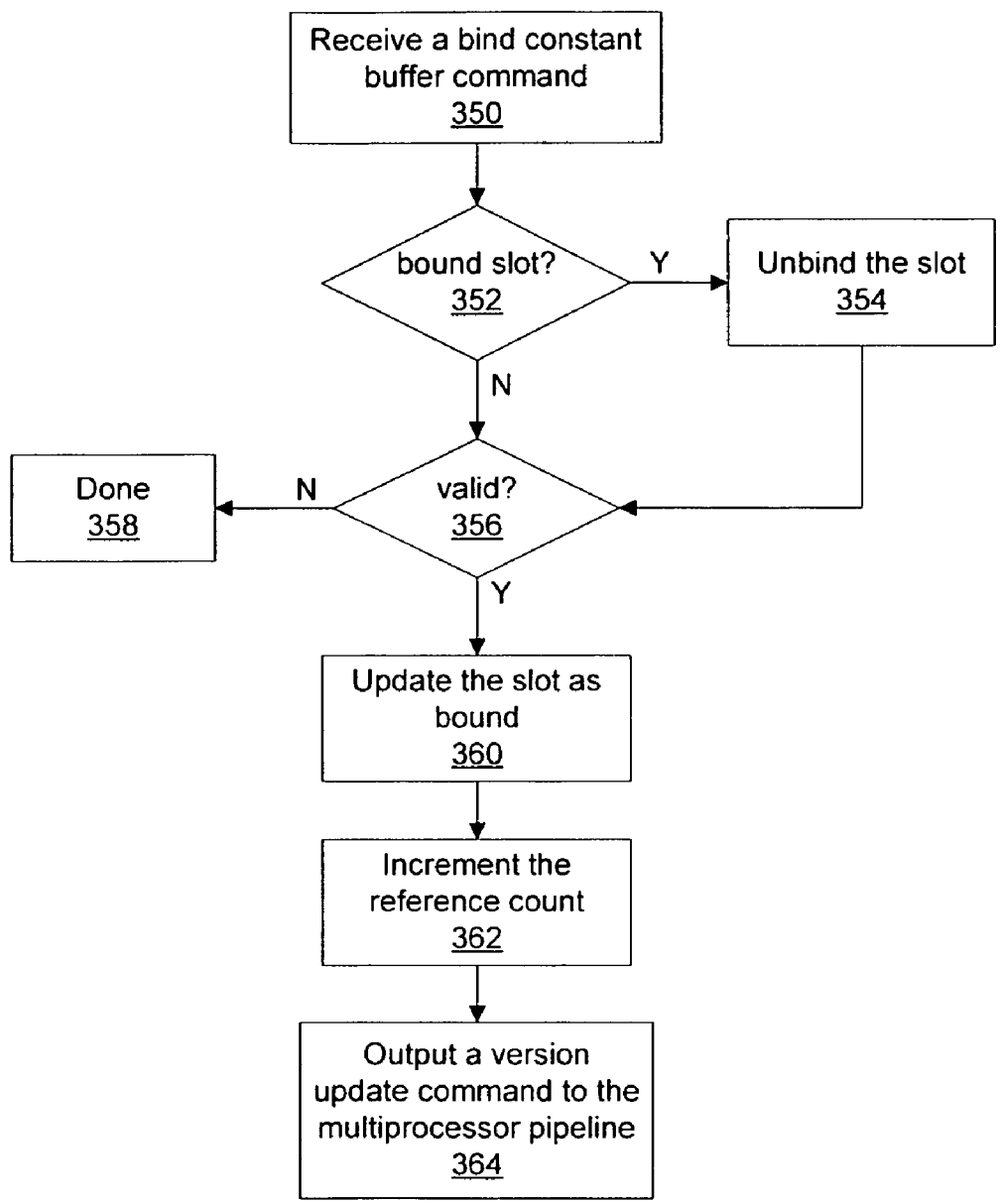
FIG. 3E illustrates a flow diagram of binding a constant buffer to a slot in accordance with one or more aspects of the present invention.

FIG. 3E illustrates a flow diagram of binding a constant buffer, such as constant buffer 142 or 144, to a slot of slot table 130 in accordance with one or more aspects of the present invention. In step 350 SCC 125 receives a bind constant buffer command. The bind constant buffer command may have been generated by SCC 125 in step 348 during the execution of a load constant buffer table command. The bind constant buffer command may include a valid flag, shader type (pixel, vertex, or geometry), slot identifier, and index corresponding to an entry in constant buffer table 135.

In step 352, SCC 125 determines if the slot corresponding to the slot identifier is bound to a constant buffer, and, if so, in step 354 SCC 125 unbinds the slot. Specifically, in step 354 SCC 125 generates and outputs a unbind feedback command including the index stored in the slot corresponding to the slot identifier to multiprocessor pipeline 150. SCC 125 then clears the bound flag in the slot corresponding to the slot identifier. When the unbind feedback command is later received from multiprocessor pipeline 150, the reference count in constant buffer table 135 corresponding to the index in the unbind feedback command is decremented.

If, in step 352, SCC 125 determines that the slot corresponding to the slot identifier is not bound to a constant buffer, then SCC 125 proceeds to step 356. In step 356 SCC 125 determines if the valid flag provided with the bind constant buffer command is asserted, and, if not, then in step 358 execution of the bind constant buffer command is complete, i.e., the slot is now unbound. If, in step 356 SCC 125 determines that the valid flag provided with the bind constant buffer command is asserted, then in step 360 SCC 125 proceeds to bind the slot to a constant buffer.

In step 360, SCC 125 sets the bound flag for the slot corresponding to the slot identifier. In step 362 SCC 125 increments the reference count of the entry in constant buffer table 135 corresponding to the index. In step 364 SCC 125 generates and outputs a version update command to multiprocessor pipeline 150. The version update command is used to update an address translation table, such as address translation table 134, located in each multiprocessor 120 so that the virtual address of the constant buffer that the slot is now bound to will be used to read constants during execution of a shader program. Therefore the version update command is output to the multiprocessors 120 via the same path as the data processing commands, i.e., the version update command is not communicated through the separate paths between SCC 125 and each multiprocessor 120.

Any shader program data processing command executed by a multiprocessor 120 that has updated an address translation table 134 by executing the version update command will read constant values from the constant buffer bound to the slot by the bind constant buffer command received in step 350. Any shader program data processing command executed by a multiprocessor 120 that has not yet updated the address translation table 134 by executing the version update command will read constant values from the constant buffer that was previously bound to the slot. Therefore, shader programs may continue executing without flushing multiprocessor pipeline 150 when constant buffers are changed. The version update command includes the constant buffer table 135 index and version value. The version update command may also include the shader type of the slot table being written.

When the majority of the constant values in a constant buffer will be changed, it is efficient to use the previously described technique of binding a slot to a changed constant buffer (or newly written constant buffer) to effectively change the constant values. When fewer constant values are changed, a different method, described in conjunction with FIGS. 4A, 4B, and 4C, may be used to change the values in the constant buffer and generate one or more versions of a single constant or multiple constants in a constant buffer.

Figure 4A:
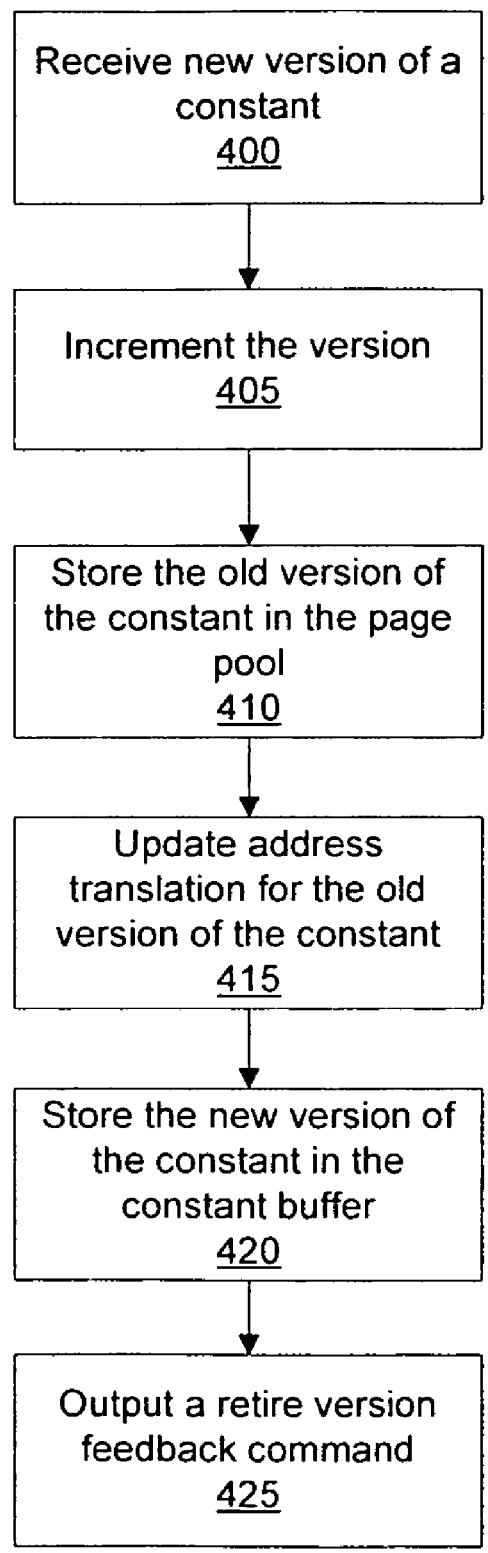
FIGS. 4A and 4B illustrate flow diagrams of exemplary methods of creating versions of constants in accordance with one or more aspects of the present invention.

FIG. 4A illustrates a flow diagram of an exemplary method of creating versions of constants in accordance with one or more aspects of the present invention. Versions of constants are generated to avoid flushing multiprocessor pipeline 150 when one or more constants are changed. When a new version of a constant is generated, the old version of the constant is copied to page pool 137. In step 400 a new version of a constant is received by SCC 125 via a load constant command. In step 405 SCC 125 increments the version stored in the entry of constant buffer table 135 that points to the constant buffer to be written with the new version of the constant. In step 410 the old version of the constant is stored in a location in page pool 137.

In step 415 the address translation corresponding to the old version of the constant is updated in order to complete execution of shader programs using the old version of the constant. Unlike the previous method of generating versions of constants by binding to a different constant buffer, the address translation tables 134 are updated in parallel when a new version of a constant is generated. Therefore, an address translation update command is broadcast to multiprocessors 120 through the separate communication paths between SCC 125 and each multiprocessor 120. Note that data processing commands output by SCC 125 to multiprocessor pipeline 150 after the new version of the constant is written will use the new version of the constant rather than the old version of the constant that was copied to page pool 137.

In step 425 SCC 125 outputs a version retire feedback command so that the old version of the constant will be retired when SCC 125 receives the version retire feedback command from multiprocessor pipeline 150. Retiring old versions of constants reduces the number of locations needed in page pool 137 to store all of the old versions of constants that may be accessed by any active shader programs. An advantage of changing individual constants within a buffer while retaining unchanged constants, is that unchanged constants stored in a cache within graphics processor 105 are retained and bandwidth needed to read the unchanged constants is reduced compared with the previously described technique of replacing the entire constant buffer by binding to a different constant buffer.

Figure 4B:
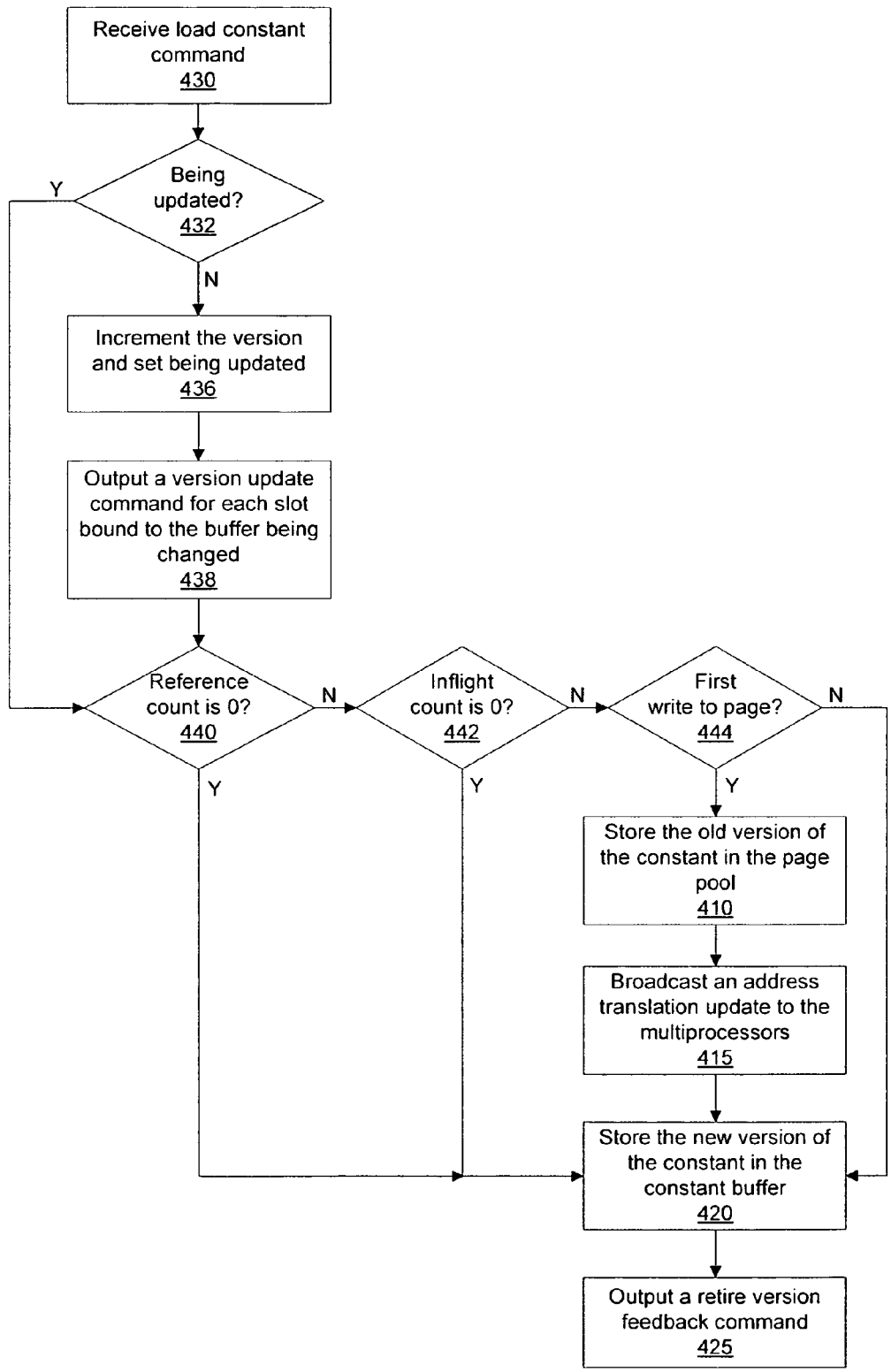

FIG. 4B illustrates a flow diagram of an exemplary method of executing a load constant command by SCC 125 in accordance with one or more aspects of the present invention. In step 430 SCC 125 receives the load constant command. In step 432 SCC 125 reads the entry corresponding to the index provided with the load constant command and determines if the "being updated" flag is set. If the "being updated" flag is set in step 432, then SCC 125 proceeds directly to step 440 and the version value is not updated.

If, in step 432 the "being updated" flag is not set, then in step 436 SCC 125 increments the version value in the entry corresponding to the index and sets the "being updated" flag. Setting the "being updated" flag indicates that a constant in the constant buffer corresponding to the index has been changed. Therefore, at least a portion of the constant buffer will have been copied to page pool 137 and the version value will have been incremented. The constant buffer should be copied to page pool 127 before any of the constants stored in the constant buffer are changed in order to preserve the old constant values. In some embodiments of the present invention when a constant is changed, only the old constant is copied to page pool 137. In other embodiments of the present invention, the (memory) page in the constant buffer that includes the old constant is copied to page pool 137. The granularity of address translation table 134 should match the granularity of the constant buffer that is copied to page table 137 in order to read the correct version of a constant for each shader program. Therefore, address translation table 134 may store single constant addresses or page addresses, depending on the size of the copies to page table 137.

All of the "being updated" flags in constant buffer table 135 are cleared when the commands transition from configuration commands to data processing commands, as previously described in conjunction with step 314 of FIG. 3B. Therefore, the version value for each constant buffer is only incremented once for each set of configuration commands and the constant buffer corresponding to that version value is used during execution of the subsequent data processing commands. For example, a first version value is associated with configuration commands 101 that are used during execution of data processing commands 102 and a second version value is associated with any command buffer that includes a constant changed by configuration commands 103 that are used during execution of data processing commands 104. As more sets of configuration commands are processed the version values corresponding to different constant buffers may vary since the constant buffers may be changed at different rates.

In step 438 SCC 125 generates and outputs a version update command to multiprocessor pipeline 150 for each slot that is bound to the constant buffer corresponding to the index. When a version update command is received by a multiprocessor 120, the multiprocessor 120 updates address translation table 134 stored in the multiprocessor 120 so that the virtual address of the constant buffer is provided by address translation table 134 when the slot is specified as an operand.

In step 440 SCC 125 determines if the reference count corresponding to the index is equal to 0, and, if so, SCC 125 proceeds directly to step 420 since no slots are bound to the constant buffer corresponding to the index. Otherwise, in step 442, SCC 125 determines if the inflight count is equal to 0, and, if so, SCC 125 proceeds directly to step 420 since data processing has completed. Otherwise, in step 444, SCC 125 determines if the load constant command will result in the first write to a page of the constant buffer corresponding to the index, and, if so, in step 410 the page of the constant buffer that corresponds to the index and includes the constant to be changed, is copied from the constant buffer to a location in page pool 137. The granularity used in step 410, e.g., memory page, entry storing a single constant, or the like, should match the granularity of the constant buffer that is copied to page table 137. Using a smaller granularity, such as an entry storing a single constant, is most efficient when only a few entries in a constant buffer are changed since only the constants that will be changed are copied to page pool 137. However, as previously mentioned, the granularity of address translation table 134 should match the granularity of the copies in order to track the location of old versions of constants.

In step 415 an address translation update is generated by SCC 125 and broadcast to each multiprocessor 120. The address translation update includes the location in page pool 137 where the constant buffer was copied and is stored in address translation table 134 in each multiprocessor 120 and should be broadcast to the multiprocessors 120 since the old constants that may be read are being moved. The constant buffer may be identified by the version value, shader type, and index when different slot tables are used for each shader type. Alternatively, the constant buffer may be identified by the index and version value.

In step 420, the constant is changed, i.e., the new value provided by the load constant command is written by SCC 125 into the constant buffer corresponding to the index. In step 425, SCC 125 generates and outputs a retire version feedback command to multiprocessor pipeline 150. When the retire version feedback command is received from multiprocessor pipeline 150 by SCC 125, SCC 125 removes the old version of the constant from page pool 137 since it is no longer needed by any active shader programs.

Figure 4C:
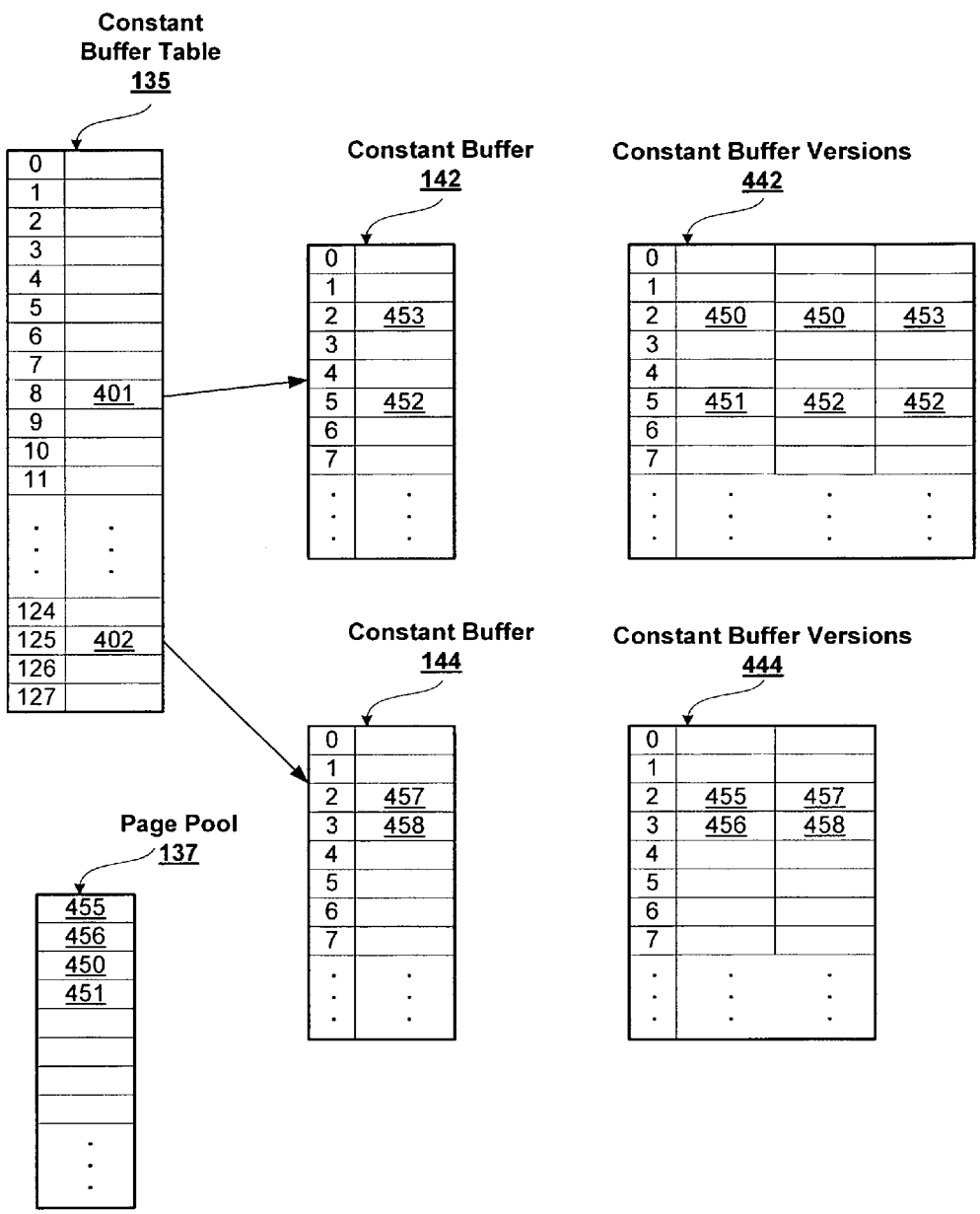
FIG. 4C illustrates a conceptual diagram of the constant buffer table, constant buffers, and page pool shown in FIG. 1A in accordance with one or more aspects of the present invention.

FIG. 4C illustrates a conceptual diagram of constant buffer table 135, constant buffers 142 and 144, and page pool 137 shown in FIG. 1A in accordance with one or more aspects of the present invention. Constant buffer versions 442 illustrate the versions that are generated when constant buffer 142 is changed. Each column of constant buffer versions 442 corresponds to a different version value of constant buffer 142. Similarly, constant buffer versions 444 illustrates the versions that are generated when constant buffer 144 is changed and each column of constant buffer versions 444 corresponds to a different version value of constant buffer 144. The rightmost columns of constant buffer versions 442 and 444 represent the contents of constant buffers 142 and 144, respectively.

An entry 401 of constant buffer table 135 that corresponds to index 8 stores a base specifying the location of constant buffer 142. A first set of configuration commands changed the constant stored at offset 5. The original constants stored at offsets 2 and 5 are shown in the first column of constant buffer versions 442, constant 450 and 451, respectively. When constant 451 was changed, it was copied to page pool 137, and constant 452 was stored at offset 5 of constant buffer 142. The version value of constant buffer 142 stored in entry 401 of constant buffer table 135 was incremented. An entry in each address translation table 134 is created to store the location in page pool 137 that stores constant 451. In embodiments of the present invention that copy entire memory pages, each location in page pool 137 stores a page and a page containing the changed constant is copied from constant buffer 142 to page pool 137.

A second set of configuration commands changed constant 450 stored in constant buffer 142 at offset 2. When constant 450 was changed, it was copied to page pool 137, and constant 453 was stored at offset 2 of constant buffer 142. The version value of constant buffer 142 stored in entry 401 of constant buffer table 135 was incremented. Note that the version number would not have been incremented if the first set of configuration commands had changed both constant 450 and constant 451. Another entry in each address translation table 134 is created to store the location in page pool 137 that stores constant 450.

An entry 402 of constant buffer table 135 that corresponds to index 125 stores a base specifying the location of constant buffer 144. A third set of configuration commands changed the constants stored at offsets 2 and 3 of constant buffer 144. The original constants stored at offsets 2 and 3 are shown in the first column of constant buffer versions 444, constant 455 and 456, respectively. When constants 455 and 456 were changed, they were copied to page pool 137, and constants 457 and 458 were stored at offsets 2 and 3 of constant buffer 144, respectively. The version value of constant buffer 144 stored in entry 402 of constant buffer table 135 was incremented. At least one entry in each address translation table 134 is created to store the location in page pool 137 that stores constants 455 and 456. In some embodiments of the present invention, constants 455 and 456 are stored in the same page of constant buffer 144 and they are stored in a single page within page pool 137. Write buffer 138 may be used to accumulate constant values to be written to page pool 137. Therefore, a single write transaction may be used to efficiently copy several constant values or one or more pages of constant values from write buffer 138 to page pool 137 instead of using a write transaction for each individual constant value.

Figure 5A:
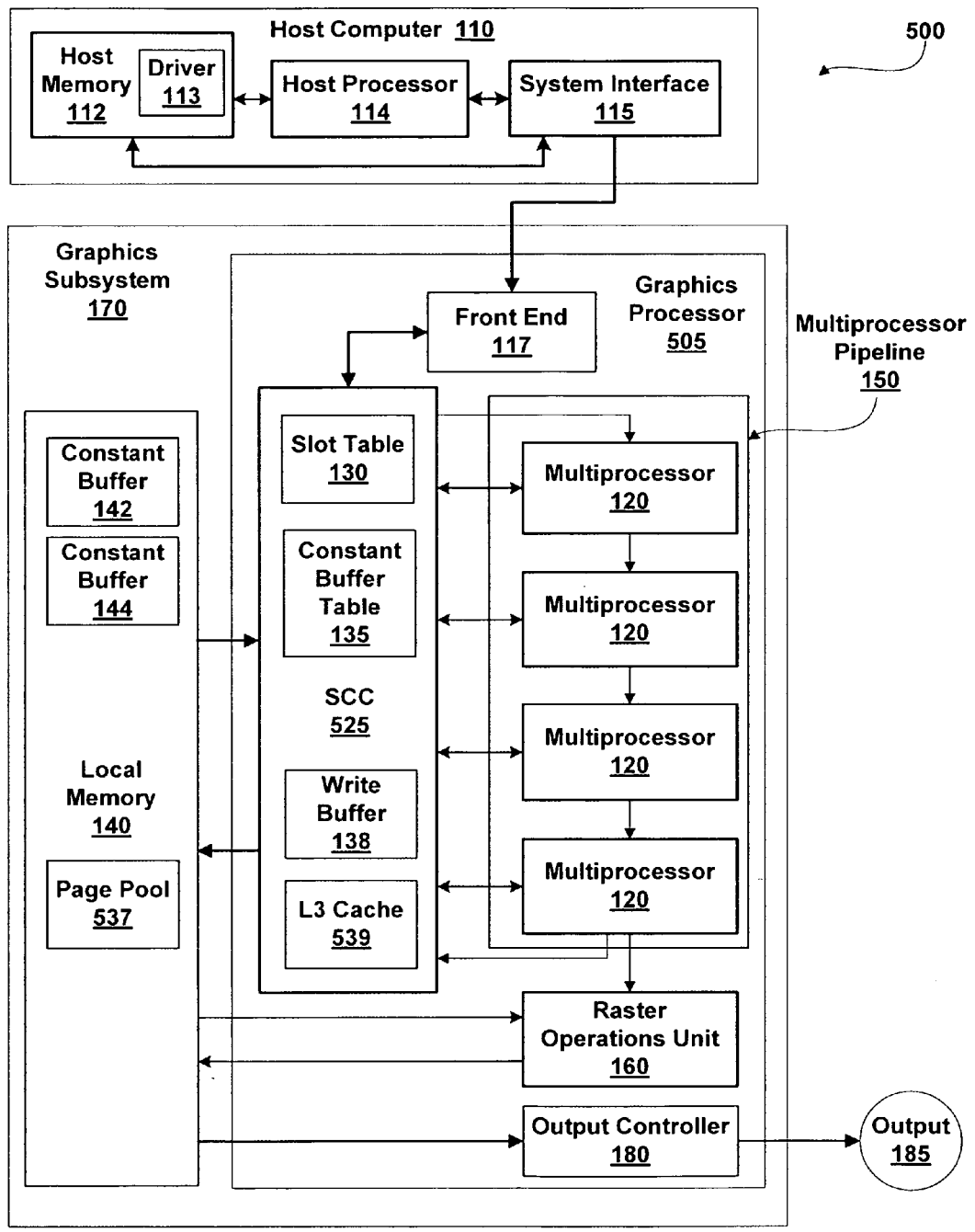
FIG. 5A illustrates another computing system in accordance with one or more aspects of the present invention.

FIG. 5A illustrates another computing system, computing system 500, in accordance with one or more aspects of the present invention. Computing system 500 includes many of the previously described elements of computing system 100. Graphics processor 505 performs the functions of previously described graphics processor 105 and includes an SCC 525 that performs the functions of previously described SCC 125. Additionally, SCC 525 includes an L3 cache 539 that is configured to store constant values. The constants stored in L3 Cache 539 may include constants also stored in constant buffer 142, constant buffer 144, and page pool 537, and is used to reduce the latency incurred when reading constants stored in local memory 140. Page pool 537 is similar to page pool 137, except that page pool 537 is stored in local memory 140. The size of page pool 537 may be programmable and page pool 537 may be larger than page pool 137 since it is not limited by the die area constraints of graphics processor 505.

Figure 5B:
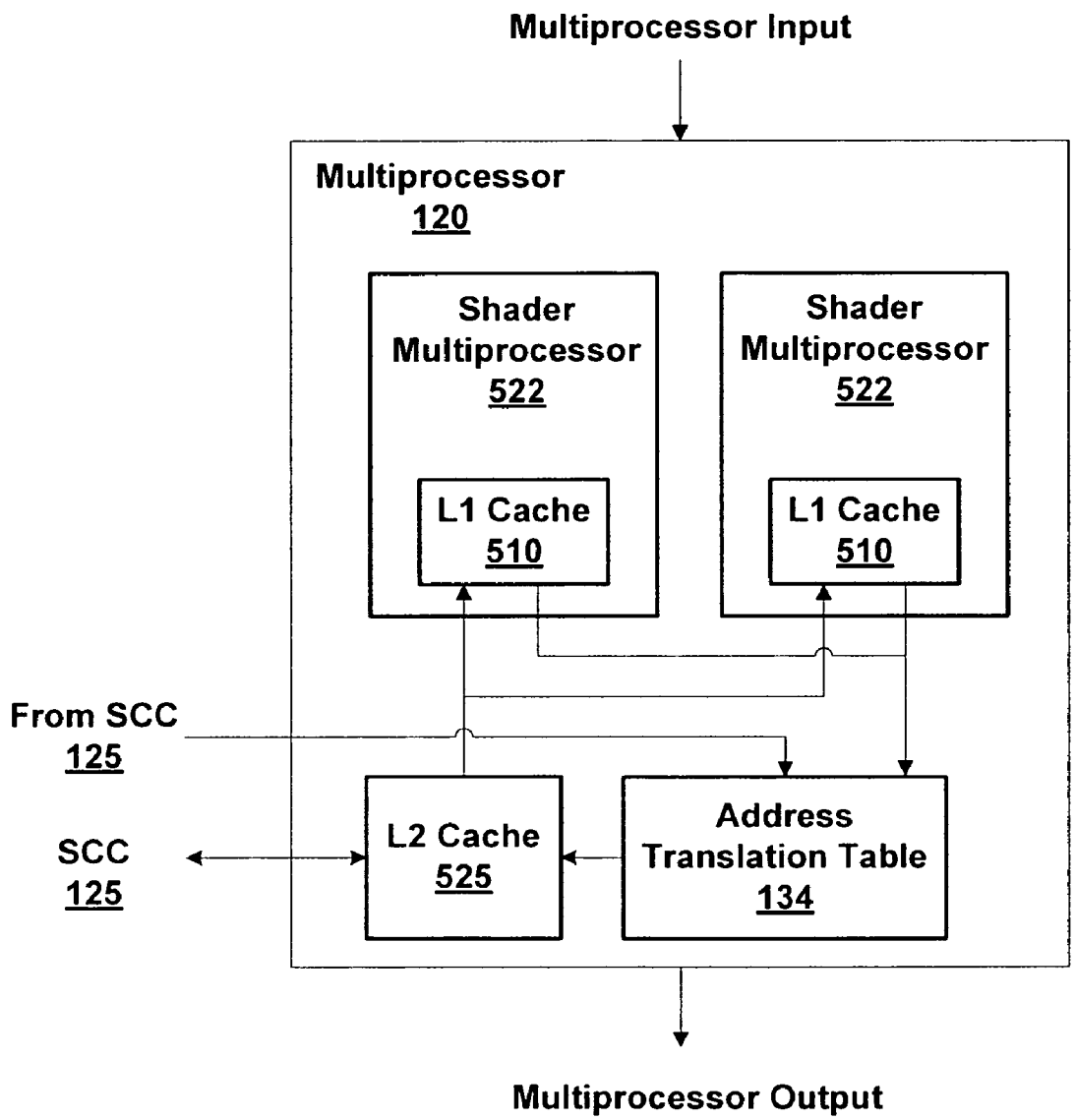
FIG. 5B illustrates another multiprocessor of FIG. 1A and a multiprocessor of FIG. 5A in accordance with one or more aspects of the present invention.

FIG. 5B illustrates another embodiment of multiprocessor 120 of FIGS. 1A and 5A in accordance with one or more aspects of the present invention. Multiprocessor 120 may include one or more shader multiprocessors 522 that may be configured to perform the functions of shader multiprocessor 122. Each shader multiprocessor 522 may include an L1 cache 510 for storing constant values. Storing frequently accessed constant values in L1 cache 510 may reduce the latency required to read the constant values during execution of a shader program. L1 cache 510 may be read using the constant buffer table index corresponding to the programmable constant and the offset indicating the entry of the constant buffer that stores the constant.

When a cache miss occurs during a read of an L1 cache 510, the read request is output to address translation table 134 and a virtual address corresponding to the constant value is determined. The virtual address is output to an L2 cache 515 that is shared between the shader multiprocessors 522 within multiprocessor 120. Like, L1 cache 510, L2 cache 515 also stores constant values that may be read by any shader multiprocessor 522 within multiprocessor 120. When a cache miss occurs during a read of an L2 cache 515, the read request is output to SCC 525. SCC 525 may read the data from L3 cache 539, constant buffer 142 or 144, or page pool 137 or 537. Constants read via SCC 525 are returned to the requesting shader multiprocessor 522 by L2 cache 515. In some embodiments of the present invention, only L1 cache 510 is included within graphics processor 505. In other embodiments of the present invention, L1 cache 510 and L2 cache 515 are included within graphics processor 505. In still other embodiments of the present invention, only L3 cache 539 or L3 cache 529 and either L2 cache 515 or L1 cache 510 are included within graphics processor 505.

Figure 6:
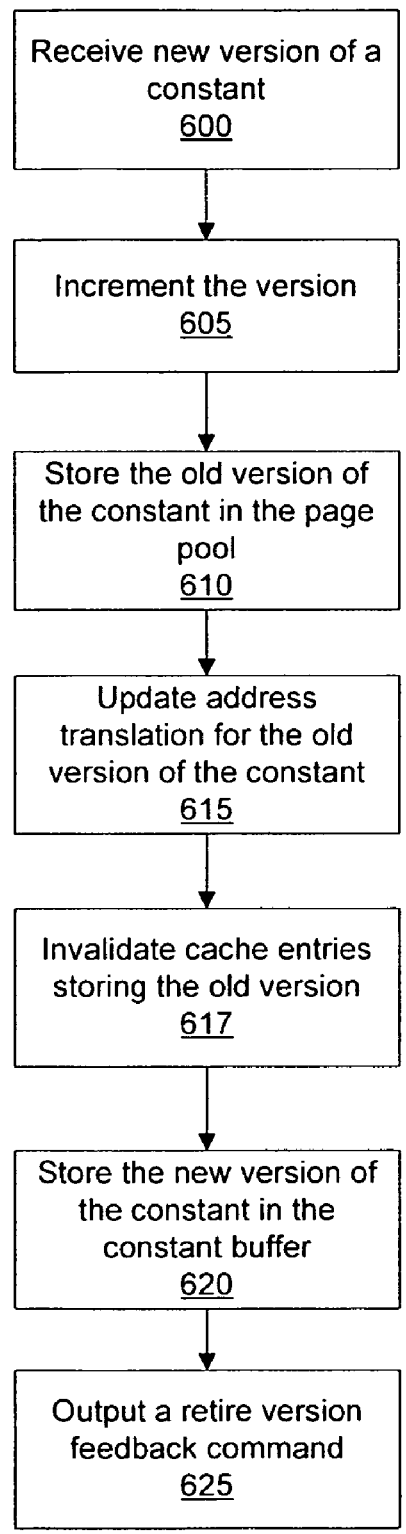
FIG. 6 illustrates a flow diagram of an exemplary method of creating versions of constants and when a cache is used in accordance with one or more aspects of the present invention.

FIG. 6 illustrates a flow diagram of an exemplary method of creating versions of constants and when a cache is used in accordance with one or more aspects of the present invention. In step 600 SCC 525 receives a new version of a constant, i.e., receives a load constant command. In step 605 SCC 525 increments the version value stored in the entry of constant buffer table 135 corresponding to the index of the constant to be changed. In step 610 SCC 525 stores the old version of the constant in page pool 537. In step 615 SCC 525 updates address translation table 134 with the location of the old version of the constant in page pool 537. In step 617 SCC 525 invalidates any entries in L3 cache 539 that store the old version of the constant. In step 615 each multiprocessor 120 invalidates any entries in its L2 cache 515 that store the old version of the constant. In some embodiments of the present invention, the old version may be prefetched into L3 cache 539 or L2 caches 525 and stored in an entry corresponding to the virtual address of the old version in page pool 537. The newest version of the constant can be found in constant buffer 142 or 144, and it may also be prefetched into L3 cache 539 or L2 caches 525.

In step 620 SCC 525 stores the new version of the constant in constant buffer 142 or 144, according to the index and offset. In step 625 SCC 525 outputs a retire version feedback command to multiprocessor pipeline 150. Persons skilled in the art will appreciate that any system configured to perform the method steps of FIG. 3A, 3B, 3C, 3D, 3E, 4A, 4B, or 6, or their equivalents, is within the scope of the present invention.

Systems and methods for using multiple versions of programmable constants within a multi-threaded processor allow a programmable constant to be changed before a program using the constants has completed execution. Processing performance may be improved since programs using different values for a programmable constant may execute simultaneously. The programmable constants are stored in a constant buffer and an entry of a constant buffer table is bound to the constant buffer. In one embodiment of the present invention, when a programmable constant is changed it is copied to an entry in a page pool and address translation for the page pool is updated to correspond to the old version (copy) of the programmable constant. An advantage is that the constant buffer stores the newest version of the programmable constant. Therefore, the newest version of each constant has a consistent address. In another embodiment of the invention, different versions of a constant buffer may be referenced by a shader program and stored as separate constant buffers. Each version of the constant buffer may store different constant values and the shader program may change the constant buffer that is used without interrupting execution of the shader program.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of storing multiple versions of a programmable constant for use during multi-threaded processing, comprising:

storing a first value of the programmable constant in an entry of a constant buffer located at a base address;

storing the base address of the constant buffer in a first entry of a constant buffer table;
receiving a second value of the programmable constant;
incrementing a version value stored in the first entry of the constant buffer table;
copying the first value stored in the entry of the constant buffer to a location in a page pool; and
storing the second value of the programmable constant in the entry of the constant buffer.

2. The method of claim 1, further comprising storing a pointer to the location in the page pool that stores the first value of the programmable constant in an address translation table, wherein the pointer is accessed using an index corresponding to the first entry of the constant buffer table and the version value.

3. The method of claim 1, further comprising deallocating the location in the page pool when the first value of the programmable constant is no longer used by the multi-threaded processing.

4. The method of claim 1, wherein the page pool and the constant buffer are stored in a shared memory.

5. The method of claim 1, further comprising performing multi-threaded processing of a first set of data using the first value of the programmable constant and performing multi-threaded processing of a second set of data using the second value of the programmable constant.

6. The method of claim 5, wherein the first set of data and the second set of data are at least one of vertex data, geometry data, and pixel data.

7. The method of claim 1, further comprising invalidating a cache entry corresponding to the first value of the programmable constant.

8. The method of claim 1, further comprising:
storing an index corresponding to the first entry of the constant buffer table in a slot table; and
incrementing a reference count stored in the first entry of the constant buffer table.

9. The method of claim 1, further comprising outputting a retire version feedback command including the index and version value.

10. A system for storing multiple versions of a programmable constant for use during multi-threaded processing, comprising:
a multiprocessor pipeline configured to execute shader program data processing commands using a set of programmable constants, wherein the set of programmable constants includes a current version of the programmable constant and an old version of the programmable constant;
a memory configured to store a constant buffer that includes the current programmable constant;
a page pool configured to store the old version of the programmable constant; and
a streaming processor array cache collector coupled between the memory and the multiprocessor pipeline and configured to generate the old version of the programmable constant by copying the current version of the programmable constant from the constant buffer to the page pool and changing the value stored as the current version of the programmable constant in the constant buffer.

11. The system of claim 10, wherein the streaming processor array cache collector is configured to update a version value corresponding to the constant buffer when the current programmable constant is generated.

12. The system of claim 11, further comprising a constant buffer table configured to store a base address and configured to store the version value in an entry, wherein the base address corresponds to a location of the constant buffer in the memory.

13. The system of claim 12, further comprising a slot table configured to bind a slot in the slot table to the constant buffer by storing an index corresponding to the entry in the slot.

14. The system of claim 10, wherein the streaming processor array cache collector is configured to retire a location in the page pool when the old version of the programmable constant stored in the location is no longer needed for the multi-threaded processing.

15. The system of claim 10, wherein the streaming processor array cache collector includes a cache configured to store one or more programmable constants in the set of programmable constants used for the multi-threaded processing.

16. The system of claim 15, wherein the streaming processor array cache collector is configured to invalidate an entry in the cache that stores the current version of the programmable constant when the old version of the programmable constant is generated.

17. The system of claim 10, wherein the multiprocessor pipeline includes a cache configured to store one or more programmable constants in the set of programmable constants used for the multi-threaded processing.

18. The system of claim 10, wherein the streaming processor array cache collector includes a write buffer configured to accumulate one or more programmable constants in the set of programmable constants to be stored in the page pool or to be stored in the constant buffer.

19. The system of claim 10, wherein the page pool is stored in the memory.

20. The system of claim 10, wherein the page pool is stored in the streaming processor array cache collector.

* * * * *